United States Patent [19]

Williams et al.

[11] 4,277,380

[45] Jul. 7, 1981

[54] WATER-DISPERSIBLE URETHANE POLYMERS AND AQUEOUS POLYMER DISPERSIONS

[75] Inventors: Roy C. Williams, East Amherst; David R. Rogemoser, Tonawanda, both of N.Y.

[73] Assignee: Textron, Inc., Providence, R.I.

[21] Appl. No.: 25,050

[22] Filed: Mar. 29, 1979

[51] Int. Cl.$^3$ .................. C08L 91/00; C08G 18/00
[52] U.S. Cl. .................. 260/18 TN; 260/29.2 TN; 528/71; 528/75
[58] Field of Search .............. 528/81, 75; 260/18 TN, 260/29.2 TN

[56] References Cited

U.S. PATENT DOCUMENTS

| | | | |
|---|---|---|---|
| 3,318,828 | 5/1967 | Seiner | 528/81 X |
| 3,412,054 | 11/1968 | Milligan | 260/30.4 N |
| 3,458,260 | 7/1969 | Owens | 356/115 |
| 3,479,310 | 11/1969 | Dietrich | 260/29.2 TN |
| 3,640,924 | 2/1972 | Hermann | 528/49 X |
| 3,748,294 | 7/1973 | Kershaw | 260/22 TN |
| 3,808,162 | 4/1974 | Allen | 260/18 TN |
| 3,996,172 | 12/1976 | Olstowski | 260/18 TN |
| 4,111,861 | 9/1978 | Godlewski | 521/123 |
| 4,150,206 | 4/1979 | Jourquin | 521/51 |
| 4,163,094 | 7/1979 | Turpin | 528/45 |

FOREIGN PATENT DOCUMENTS 953673 3/1964 United Kingdom .............. 260/18 TN

*Primary Examiner*—C. A. Henderson
*Attorney, Agent, or Firm*—Bernard & Brown

[57] ABSTRACT

Aqueous dispersions of polyurethane polymers in ammonium salt form are prepared by reacting diisocyanates with a polyhydroxy, carboxylic acid to form an isocyanate-terminated prepolymer that is united with an unsaturated fatty acid ester polyol to provide carboxylic-containing, water-dispersible polyurethanes having properties exhibited by organic solvent-based, oil-modified polyurethanes. The aqueous dispersions can be formed by neutralization of "oil-modified," carboxylic group-containing, water-dispersible polyurethanes with ammonium salt-forming materials such as ammonia and amines. The aqueous dispersions are especially desirable coating compositions.

27 Claims, No Drawings

WATER-DISPERSIBLE URETHANE POLYMERS AND AQUEOUS POLYMER DISPERSIONS

The present invention relates to "oil-modified", urethane polymers and to aqueous dispersions of the polymers that are suitable for use as coating compositions and exhibit properties similar to those of organic solvent-based, oil-modified polyurethanes.

BACKGROUND OF THE INVENTION

Urethane polymers have found widespread use in coatings for fabrics, plastics, wood, metal, and the like, due to their advantageous properties such as their good chemical resistance, abrasion-resistance, toughness, elasticity and durability, and their ability to cure rapidly. Conventionally, polymeric urethane coatings have been applied as solutions in, for instance, polar or aromatic hydrocarbon solvents. When the urethanes are of certain types, they may be compatible with aliphatic hydrocarbon solvents. While the coating is being dried, or cured, these solvents vaporize into the atmosphere.

Oil-modified, organic solvent-based, urethane compositions have been traditionally used as clear or pigmented air-drying, varnish-type coatings. These compositions are particularly used where higher levels of hardness and abrasion resistance and quick-drying capabilities are needed such as on floors or other objects subjected to wear. These properties are characteristics of the urethane components of the polymer while the air-drying capability is supplied by the oil portion, and these factors are generally balanced to give optimum properties. Sometimes alkyd resins, such as those prepared from phthalic anhydride oils and polyols, are physically or chemically incorporated in the compositions to lower cost or modify the products to develop particular performance properties. The resins may contain aliphatic hydrocarbon solvents to reduce viscosity and driers to accelerate autooxidation. When the coatings dry the solvent vaporized is an economic loss and, quite importantly, the vaporous solvent may pollute the atmosphere.

Aqueous, polyurethane coating compositions are, therefore, particularly desirable due to the low cost and availability of water. Moreover, aqueous coating compositions are advantageous since the evaporation of water into the atmosphere has little, if any, adverse effect on the environment whereas conventionally employed organic solvents may be toxic, flammable, odoriferous, or photochemically-sensitive, and thus, may be smog-formers in the daylight atmosphere due to photochemical oxidation. Furthermore, water which is readily available can be used to thin the water-based coating compositions and can be used in clean-up operations. However, urethanes generally are not compatible with water unless special ingredients and/or particular steps of manufacture are employed in their synthesis.

One approach to provide water-dispersible, polyurethane-containing compositions has been through the use of emulsifiers. This procedure generally suffers from the disadvantages that the dispersions are relatively unstable and the resultant films are water-sensitive.

Another way to prepare water-dilutable urethane coatings and thereby reduce or eliminate the organic solvent content is to make ammonium-neutralized, polyelectrolyte salts of the polymers. The presence of alcoholic cosolvents may be helpful in making the aqueous dispersion. Thus, when the ammonia or amine of the ammonium salt evaporates on drying, the salt deionizes and becomes water-insoluble. The film left behind from the dispersion then auto-oxidizes to a tough, water-resistant coating. In order to form the polyelectrolyte salts, pendant carboxylic groups may be introduced along the polymer chains of the oil-modified urethane polymer.

Introducing carboxylic groups into urethane polymers may be a difficult procedure due to the reactivity of these groups with the diisocyanate monomers or isocyanate-terminated prepolymers used to build the polymer chains. This reactivity can lead to reductions in the carboxylic group content of the product and formation of undesirable side products. Thus, the normal sources of carboxylic groups used in the preparation of alkyd resins can often not be effectively used to make these polymers. One must then inject the carboxylic group source after the isocyanate has reacted with the hydroxyl groups to form the urethane, or choose a special source of carboxylic groups that are unreactive with isocyanates at the temperatures used to form the polymers. Introducing the carboxylic group source after the reaction of the isocyanate groups is generally not practical due to the heat sensitivity and resulting discoloration of the urethane polymer. Even the lower temperatures, e.g., 250° F.–300° F., at which half-ester formation proceeds from acid anhydrides to leave carboxylic groups can be detrimental.

Proposals for incorporating carboxylic groups into urethane polymer structures in order for these groups to be neutralized to form suitable salt groups and thereby impart a degree of water-dispersibility to the urethane polymer are evident in U.S. Pat. Nos. 3,412,054; 3,479,310; and 3,870,684. Carboxylic groups in urethane polymers can result, however, in increased moisture sensitivity in the coatings or films formed from dispersions of such polymers. Aqueous polyurethane dispersions such as those exemplified in U.S. Pat. No. 3,412,054 in which a drying oil component is present in the initially-formed polyurethane are notably deficient in drying rate.

The use of dimethylol propionic acid (DMPA) which has a tertiary carboxylic group having low reactivity with isocyanate groups is described in U.S. Pat. No. 3,412,054 to prepare water-dispersible urethanes. In the procedure of the patent the DMPA in the presence of other polyols, if desired, is first reacted with fatty acids to make the DMPA compatible for reaction with the diisocyanate. The DMPA ester is then reacted with the diisocyanate to form the polymer, but this procedure gives inferior products. Alternatively, the patent describes the preparation of a polymer of TDI and DMPA in solvent, but nothing further is done with the polymer. These procedures do not give a suitable polymer for use in varnish-type coatings. The poor results are apparently because mixtures of the reactants are incompatible when the organic polyol is an oil-polyol alcoholysis product, and will not react. The present invention overcomes these difficulties.

Efforts have been made to improve the properties of coatings made with aqueous dispersions of urethane polymers. One procedure has been to incorporate into the urethane polymer structure, fatty acid-containing moieties derived, for example, from drying or semi-drying oils, to increase the hydrophobic properties of the resulting urethane polymer films. U.S. Pat. Nos. 4,046,729; and 4,066,591, disclose polymer modifications of this type. To the extent that these patents are concerned with the use of unsaturated polyesters, the latter are united as part of an isocyanate-terminated prepolymer. The efforts in the prior art to make aqueous dispersions, of oil-modified polyurethanes have been successful to varying extents, and at least for the most part the resulting dispersions or coatings have significant shortcomings when compared with those made from organic solvent-based polymer compositions.

SUMMARY OF THE INVENTION

Given the interest in providing convenient, pollution-free, low-cost, film-forming coating products, there is a continuing need for development of urethane polymer materials that can be employed to make clear, stable compositions containing water as the principal solvent or dispersing medium, but which nonetheless provide films or coatings that have, for instance, good water-resistance and abrasion-resistance, and flexibility. In accordance with the present invention such water-dispersible polyurethanes are provided by reacting organic diisocyanates with carboxylic group-containing polyols to prepare the corresponding isocyanate-terminated, carboxylic group-containing prepolymers. The prepolymer is reacted or extended with an unsaturated fatty acid esterpolyol to give the desired water-dispersible, carboxylic group-containing polyurethanes of the present invention. The latter polyurethane can be dispersed in water through neutralization of its carboxylic groups with an organic or inorganic, ammonium salt-forming base such as ammonia or amines. The aqueous dispersions are relatively clear and stable, and may be in essentially colloidal form. Coatings made with the dispersions can exhibit the properties of organic solvent-based, oil-modified polyurethanes, and have a good balance of properties in terms of, for example, drying rate, hardness and flexibility to embody the coating with resistance to cracking at low temperatures, at least when in preferred form.

The present invention provides stable, aqueous dispersions of "oil-modified" urethane polymers that can be diluted with water to a viscosity or non-volatile content suitable for application to a substrate as a coating. The dispersions contain polymer solids that are essentially colloidal in size, and the dispersions are relatively clear as compared with urethane emulsions or latexes. The appearance of the dispersions can be from slightly opaque to relatively clear, and may approach, if not reach, the appearance of a solution. The rheological properties of the dispersions may resemble those of a true solution, even when the oil-modified urethane polymer dispersions of this invention are diluted with water. Films formed from the dispersions can cure at room temperature, and thus may be described as low energy-consuming materials. The aqueous dispersions can be relativly non-polluting since only relatively small amounts of volatile organic material need be present in the aqueous dispersions. The aqueous dispersions of this invention can have a relatively neutral pH, thus a wide selection of pigments can be used without having compatibility problems in the dispersion, and the polymers need not be subjected to high pH conditions which may otherwise tend to promote hydrolysis of the polymer chain. Such aqueous dispersions further possess acceptable viscosity and storage stability characteristics so as to be particularly useful as coating compositions.

DETAILED DESCRIPTION OF THE INVENTION

The "oil-modified", water-dispersible urethane polymers of this invention are made from an isocyanate-terminated, prepolymer prepared by reacting an essentially diisocyanate material with a carboxylic group-containing, urethane-forming polyol component. Urethane prepolymers are thus realized which contain pendant carboxylic groups available for quaternary ammonium salt formation by neutralization with ammonia or tertiary amines.

The essential polyol component employed in making the urethane prepolymers used in this invention has at least one carboxylic acid group

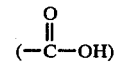

or carboxylate ion group

per molecule which is relatively non-reactive with isocyanates. Both the carboxylic acid group and carboxylate ion group are referred to herein as carboxylic groups. Thus, the isocyanate groups of the diisocyanate react preferentially with the hydroxyl groups of the polyol molecule to provide a polymer structure with pendant carboxylic groups available for quaternary salt formation even after reaction of the prepolymer with the unsaturated fatty acid esterpolyol component.

The essential carboxylic group-containing polyols used in making the isocyanate-terminated prepolymers are dihydroxy-containing alkanoic acids. The carboxylic group-containing polyol can be reacted with the diisocyanate without significant reaction between the carboxylic groups and the diisocyanate component. Among the polyols which may be employed are those having relatively unreactive, free carboxylic acid groups, for instance, the alkanoic acids having one or two substituents on the alpha carbon atom. The substituent may be, e.g., a hydroxyl or alkyl group, for example, an alkylol group. The polyol has at least one carboxylic group, and generally has 1 to about 3 carboxylic groups, per molecule. The polyol alkanoic acids which may conveniently be employed in accordance with this invention frequently have 2 to about 20 or more, preferably 2 to about 10, carbon atoms such as tartaric acid, the 2,2-dialkylol alkanoic acids, e.g., having alkylol groups of 1 to about 3 carbon atoms, and the like.

A preferred group of dihydroxy alkanoic acids are the 2,2-dimethylol alkanoic acids which may be represented by the structural formula

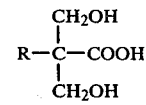

wherein R is hydrogen or alkyl, e.g., lower alkyl, say, of 1 to about 8 carbon atoms. The 2,2-dimethylol alkanoic acids which may be employed in accordance with this invention include 2,2-dimethylol acetic acid, 2,2-dimethylol propionic acid, and the like. A preferred dihydroxy alkanoic acid is 2,2-dimethylol propionic acid. Minor amounts of polyols, in addition to the carboxylic group-containing polyol, may be employed in making the prepolymers, these additional polyols include those having a molecular weight of at least about 400.

The urethane prepolymers used to make the products of the present invention are prepared by reacting the carboxylic-group containing polyol with an essentially hydrocarbon diisocyanate. Such diisocyanates can be aliphatic, alicyclic or aromatic. The aromatic diisocyanates may be less preferred in situations in which yellowing due to the effects of ultraviolet light, is undesirable. The diisocyanates can contain non-interfering groups, e.g., aliphatic hydrocarbon radicals such as lower alkyl or other groups, having substantially non-reactive hydrogens as determined by the Zerewitinoff test, *J. Am. Chem. Soc.*, 49, 3181 (1927). The diisocyanates often have at least about 6 carbon atoms and usually do not have more than about 40 carbon atoms. Diisocyanates of about 8 to 20 carbon atoms in the hydrocarbon group are preferred. Suitable diisocyanates include 2,4-tolylene diisocyanate; 2,6-tolylene diisocyanate; 1,4-cyclohexane diisocyanate; dicyclohexylmethane 4,4'-diisocyanate; diphenylmethane 4,4'-diisocyanate; diphenylmethane 3,4'-diisocyanate; xylene diisocyanate; 1-isocyanato-3-isocyanatomethyl-3,5,5-trimethylcyclohexane (isophorone diisocyanate); hexamethylene diisocyanate; methylcyclohexyl diisocyanate; 2,4,4-trimethylhexylmethylene diisocyanate, and the like. The aliphatic and alicyclic diisocyanates employed in this invention generally exhibit good resistance to the degradative effects of ultraviolet light. Among the aliphatic diisocyanates is trimethylhexamethylene diisocyanate, while preferred alicyclic diisocyanates are 4,4'-methylene bis(cyclohexyl isocyanate) and isophorone diisocyanate. A preferred diisocyanate is tolylene diisocyanate. The polyisocyanate component used to form the prepolymers may contain a portion of polyisocyanates having more than two isocyanato (NCO) groups per molecule providing the urethane prepolymer compositions are not unduly deleteriously affected.

The isocyanate-terminated polyurethane prepolymer reaction products employed in the present invention can be made by reacting an excess of diisocyanate with the carboxylic-group containing polyol. Stepwise mixing of the diisocyanate and polyol may be used to enhance temperature control. The reaction temperatures for making the various urethane prepolymers are generally elevated but sufficiently low to avoid undue reaction of the carboxylic group of the polyol with the diisocyanate. Such temperatures may be up to about 75° C. or more, with about 40° to 60° C. being preferred. Advantageously, the ratio of NCO group in the isocyanate per isocyanate-reactive OH group in the urethane-forming polyol on an equivalent basis ranges from about 1.5 to 2.5:1, preferably from about 1.8 to 2.2:1, or approximately 2:1. The prepolymer-forming reaction is preferably continued until there is little if any, unreacted hydroxyl functionality remaining. The reaction can be conducted in the presence of a catalyst such as organo-tin compounds, tertiary amines, and the like. The acid value of the prepolymer is sufficient so that after it is oil-modified the salt form of the oil-modified polymer can be dispersed in water. This acid value should take into account any change that may occur after the prepolymer is formed and before it is dispersed in water in oil-modified form. The acid value of the prepolymer is often in the range of about 80 to 150, preferably about 90 to 130, on a solids basis when there is little, if any, of the essentially inert, more hydrophobic solvent present, and about 100 to 140 on a solids basis when both this type of solvent and a coupling solvent are present. The isocyanate group content of the prepolymer may be, for example, about 5 to 20 weight percent, preferably about 10 to 20%, of the prepolymer solids.

The urethane prepolymer is generally prepared in the presence of a solvent for the reactants and the prepolymer product. The solvents are usually organic and may be comprised essentially of carbon and hydrogen with or without other elements such as oxygen or nitrogen. The solvent employed is essentially inert to the reaction, and, thus, should not contain active hydrogen as determined by the Zerewitinoff test. Solvents which may be employed include dimethylformamide, esters, ethers, ketoesters, ketones, e.g., methyl ethyl ketone and acetone, glycol-ether-esters, chlorinated hydrocarbons, aliphatic and alicyclic hydrocarbon pyrrolidones, e.g., N-methyl pyrrolidones, hydrogenated furans, aromatic hydrocarbons, and the like, and mixtures thereof. The amount of solvent employed in making the prepolymer can vary widely and should be sufficient to provide a prepolymer solution having a sufficiently low viscosity to facilitate the preparation of the prepolymer used in this invention. For example, the non-volatile or polymer solids content of the prepolymer solution may be about 30 to 80 weight%, preferably about 45 to 65%.

Urethane prepolymer formation can be carried out by admixing the diisocyanate and carboxylic group-containing polyol reactants in any suitable manner desired. In one especially preferred embodiment of the present invention, a urethane prepolymer containing free carboxylic groups is formed by adding the polyol to a diisocyanate-containing solution until the free isocyanate (NCO) content of the urethane prepolymer is lowered to the desired extent. In this manner, an excess of diisocyanate is essentially always present during prepolymer formation and undue amounts of high molecular weight prepolymers are not formed. The unsaturated fatty acid ester polyol can then be added to the prepolymer solution to "oil-modify" the prepolymer and substantially react the isocyanate content of the reaction mixture, e.g., to an isocyanate content of less than about 3%, by weight, preferably less than about 1%, on a solids or non-solvent basis. The prepolymer and unsaturated fatty acid ester polyol components can be present in amounts that provide at least about the stoichiometric amount of hydroxyl groups based on the isocyanate group content of the prepolymer to make oil-modified polyurethanes of a desirable, relatively low molecular weight. Preferably, the amount of isocyanate group-reactive hydroxyls in the polyester polyol is sufficient to provide an excess of hydroxyl groups, e.g. up to about 2.5 moles of hydroxyl groups per mole of isocyanate group, preferably about 1.1 to 1.8 moles per mole of isocyanate group. The oil-modification reaction introduces unsaturated fatty acid moieties into the polymer structure. The oil-modified urethane polymers prepared in accordance with this invention have acid values sufficient for their salt form to be dispersible in the aqueous medium, and such values may often be about 30 to 80, preferably about 35 to 55, on a nonvolatile basis. The solids content of the solutions may be, for instance, about 50 to 90 or more weight%, preferably about 60 to 85%, before salt formation and dispersion in water.

The esters employed for oil-modification can be reaction products of unsaturated fatty acids and aliphatic or aromatic polyols or polyether polyols having at least about two, preferably about three or more, hydroxy groups per average molecule. Advantageously, the polyols have molecular weights of up to about 400, e.g., about 60 to 400. Among these relatively low molecular weight polyols useful for preparation of the unsaturated fatty acid ester polyols are those having up to about 20 carbon atoms per molecule, for instance, ethylene glycol, propylene glycol, 1,2-pentanediol, 1,3-propanediol, 1,4-butanediol, 1,3-butylene glycol, trimethylol propane, glycerine, trimethylol ethane, 1,4-cyclohexane dimethanol, 1,6-hexanediol, neopentyl glycol, pentaerythritol, bisphenol A (2,2-bis(4-hydroxycyclohexyl) propane), polyether reaction products of glycerine or pentaerythritol with ethylene or propylene oxides or glycols and the like, and mixtures thereof.

Fatty acid sources which can be employed in preparation of the unsaturated fatty acid ester polyols include the ethylenically-unsaturated fatty acids and their esters having up to about 22 carbon atoms in the fatty acid moieties, especially about 12 to 18 carbon atoms. These fatty acid materials often contain from one to about three or more olefinic double bonds, and may be referred to as drying or semi-drying oils, at least when in ester form. The esters are frequently esters of the fatty acid moiety and a low molecular polyol having about three or more hydroxyl groups per molecule. In their naturally-ocurring forms the esters are generally glycerides. Esters of polyols having about three to four hydroxyl groups per molecule are preferred reactants for the present invention. The unsaturated fatty acid materials include, for example, linoleic acid, palmitoleic acid, linolenic acid, eleosteric acid, licanic acid, arachidonic acid, ricinoleic acid and the like. Especially useful are the fatty acids or esters derived from natural sources such as dehydrated castor oil, sunflower oil, cottonseed oil, linseed oil, olive oil, safflower oil, sardine oil, tung oil, tall oil, soybean oil, and the like. Unsaturated fatty acid ester polyols that are especially suitable for reaction with them are the transesterification products of pentaerythritol and drying or semi-drying oils. Esterification catalysts such as calcium naphthenate can optionally be utilized to promote the transesterification reaction.

The unsaturated fatty acid ester polyol materials that are reacted with the isocyanate-terminate prepolymers in accordance with this invention can be mostly dihydroxy from the standpoint of functionality in the reaction with the isocyanate-terminated prepolymer. The polyurethane reaction products may, therefore, have some, branching due to urethane formation. Minor amounts of materials that are monofunctional or trifunctional or have greater functionality with respect to urethane group formation may be present in the reaction mixture. However, the primary urethane group-forming reaction may be between diisocyanate and polyol having on the average about two hydroxyl groups per average molecule.

The polymers of the present invention can advantageously contain minor amounts of unesterified low molecular weight polyols sufficient to enhance the hardness of the films or coatings which can be formed from the urethane polymer dispersions of the present invention. These low molecular weight polyols are advantageously of the same type as those noted above in connection with the components of the unsaturated fatty acid ester polyols. Generally, the unesterified low molecular weight polyols may comprise up to about 25% by weight of the total polyol mixture, for instance, about 1 to 10% by weight on a polymer solids basis.

The oil-modified urethane polymers, dissolved in essentially non-aqueous solvents as described above, contain carboxylic groups that can be neutralized to form polymer salts that can be dispersed in water to provide film-forming compositions. The solvent in which the polymer is dissolved when the solution is dispersed in water should have a sufficient balance of hydrophobic and hydrophillic properties to facilitate dispersal of the polymer in the aqueous phase. This will usually mean that when the dispersion is made the solvent should contain at least a portion of the type known as couplers in order to obtain the more desirable dispersions. These coupling solvents generally contain one or both of oxygen and nitrogen, along with carbon and hydrogen. Such solvents are listed above in the description of the prepolymer-forming reaction system. These polymer solutions have sufficient coupling solvent to produce the desired relatively clear, stable aqueous dispersion, and the weight percent of coupler solvent in the solution dispersed in the aqueous medium may be about 1 to 40 weight %, preferably about 10 to 35 weight %. The weight ratio of coupling solvent to the more hydrophobic inert reaction solvent, if both be present in the compositions dispersed in the aqueous medium, may often be about 40 to 0.1:1, preferably about 20 to 0.5:1.

Although some coupling solvents may be inert so as to be able to serve as a solvent for the reactants and products in the prepolymer-forming operation, it may be advantageous to use a solvent during prepolymer formation that is different from the solvent to be employed in making the dispersion. For example, hydrocarbon or ketone solvents may be suitable for use in forming the prepolymer, but undesirable, at least without the presence of a coupling solvent, in making the aqueous dispersion. The solvent change may be made by merely adding coupling solvent, or making such addition and removing part or substantially all of the solvent already in the composition, or in any other manner. In some situations the aqueous dispersion initially obtained may be more opaque or translucent than desired, and a clearer dispersion may be produced by adding more coupling solvent to the dispersion.

When the solvent of the prepolymer solution is to be replaced at least in part, it is advantageous that this solvent have a relatively low boiling point to facilitate its later replacement. For example, some relatively volatile solvents such as ketones, e.g., acetone and methyl ethyl ketone, that exhibit good solubility for the reactants and products in the prepolymer system, have low viscosities that facilitate mixing. The ketones are, therefore, preferred solvents. These solvents, however, do not seem to have sufficient hydrophillic or coupling properties to make their presence particularly desirable in forming the aqueous polymer salt dispersion, at least not without the presence of a coupling solvent having greater hydrophillic properties, e.g. the alkoxy alkanols. If the solvent employed during prepolymer formation or modification is to be present during dispersion of the oil-modified polymer in an aqueous medium, the solvent should have sufficient hydrophillic properties to also be dispersible in the aqueous medium. Thus, the dispersion should be stable, for example, the addition of substantial amounts of water should not cause polymer gelation and phase separation. The lower boiling solvent may be replaced with a higher boiling solvent with greater coupling properties, e.g. an alkanol or alkoxyalkanols, before making the aqueous dispersion. After addition of the higher boiling solvent, at least part, preferably a major part, of the lower boiling solvent may then, if desired, be distilled from the mixture.

The aqueous dispersions of the invention are essentially colloidal solutions of polymer in solvents, preferably containing a coupler among which are butoxyethanol (Butyl Cellosolve), n-butanol and propoxy-n-propanol. Preferred coupling solvents are alkanols, especially the alkoxyalkanols of about 4 to 12 carbon atoms. The couplers may, if desired, be comprised of other organic coupling solvents such as those listed above containing one or both of oxygen and nitrogen, along with carbon and hydrogen.

Aside from facilitating formation of the desired aqueous dispersion, the coupling solvent could be selected to have a boiling point above about 50° C., or above about 90° C., with little tendency to be lost from the dispersion before it is applied as a coating. Such losses may be objectionable from a pollution standpoint, and may result in a less stable dispersion or even cause an undesirable phase separation in the aqueous product. Before the oil-modified urethane materials are neutralized and dispersed in water, they are advantageously provided in the form of coupling solvent-containing solutions having a non-volatile content of from about 50% to 90 or more% by weight, preferably about 60 to 85% by weight. Such solutions may generally have viscosities ranging from about 1 to 500 Stokes, preferably from about 10 to 100 Stokes.

In forming the aqueous dispersion of the oil-modified, carboxylic group-containing, urethanes of the present invention at least a portion of the carboxylic groups of the oil-modified urethane polymer can be reacted with ammonium hydroxide or with amines having at least one salt-forming amine, preferably tertiary, group. Although primary or secondary amines may be used tertiary amines are less likely to be involved in unwanted reactions. The aliphatic amines preferably include tertiary amines, e.g. trialkyl amines having 3 to about 12 carbon atoms, such as trimethyl amine, methyl diethyl amine, N,N-dimethylethanol amine, tripropyl amine, and the like. Thus the alkyl groups of the amine can be substituted with, for instance, hydroxy groups, as in the alkanoltertiaryamines such as the dialkylmonoalkanol, alkyldialkanol and trialkanol amines. Triethyl amine, and N,N-dimethyl ethanol amine are preferred amines. Desirably, the amine employed is relatively volatile.

The ammonium hydroxide or amines react to form quaternary salts of ammonia or amines and the carboxylic groups of the polymer which salts are generally more hydrophillic than the free acid group-containing polymers. The quaternary ammonium salts of the carboxylic groups of the oil-modified urethane polymers herein are preferably capable of decomposing during the curing of coatings of the urethanes of this invention, with ammonia or the amine being volatilized and removed from the coating. Thus, the resulting urethane coatings may be less sensitive to water than the corresponding quaternary ammonium salt group-containing materials.

The quaternary ammonia or amine salts of the carboxylic acids are provided in amounts such that the aqueous, neutralized urethane polymer dispersion is stable over long periods of time as an essentially colloidal dispersion. In their most advantageous form the dispersions are infinitely dilutable with water, although some may not be, at least not without becoming hazy. The ammonium hydroxide or salt-forming amine is generally provided in a molar ratio to the carboxylic groups of the polymer of about 0.3:1 to 1.5:1, preferably about 0.7:1 to 1.2:1. The neutralized salt of the polymer can have salt groups other than the ammonium or amine salt groups present, e.g. a minor amount of alkali metal salt, such as the lithium, sodium, and/or potassium salts, on a molar salt basis. Urethane films containing unduly large amounts of alkali metal salts are generally less water resistant than films prepared from urethane dispersions of more highly ammonia-or amine-neutralized polymers. Therefore, if the urethane polymer salts contain alkali metal salt groups such as alkali metal salt groups should not be in amounts sufficient to unduly detract from the properties of the ultimate film.

The ammonium hydroxide or amine is preferably added to the polymer in the presence of a sufficient amount of water to form a dispersion of the neutralized polymer in the water. The water can conveniently be added in admixture with ammonium hydroxide or the amine. Alternatively, ammonium hydroxide or the amine can be added before the addition of the water. Frequently, the water is provided in a weight ratio to oil-modified, urethane polymer salt solids of about 1.5:1 to 40:1, preferably about 2:1 to 10:1, on a weight basis. The aqueous dispersions may also contain a weight ratio of polymer salt solids to coupling solvent of about 1.5 to 100:1, preferably about 2 to 10:1.

The salt-forming reaction between the ammonium hydroxide or amine and the carboxylic acid groups of the urethane polymer can occur at ambient temperature; however, lower or elevated temperatures of, e.g., about 15° C. to 50° C. can also conveniently be employed. The polymer mixture can advantageously be agitated and the addition of the ammonium hydroxide or amine and water conducted over a period of time, e.g., intermittently or continuously for about 0.5 to 30 minutes. If the water, or a portion of the water, of the dispersion is added after the neutralizing agent or neutralizing agent/water mixture, the polymer mixture is advantageously agitated during such water addition to assist in providing the dispersion of the polymer in the aqueous mixture.

The oil-modified urethane polymer dispersed in the aqueous medium in accordance with the present invention may be in the lower colloidal particle size range, e.g., having an average particle size up to about 0.1 micron, and the average size of the oil-modified urethane-containing polymer particles preferably have an average size of up to about 0.05 micron, e.g., about 0.001 to 0.05 micron. In the aqueous dispersion the amount of ionized carboxylic group

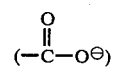

available from the neutralized carboxylic group in salt form may generally be at least about 2.3, e.g., about 2.3 to 6.3, weight percent of the neutralized, urethane polymer on a nonsolvent, non-aqueous basis, i.e., solids basis, preferably at least about 2.7 weight percent, say about 2.7 to 4.3 weight percent.

Colloidal dispersions of the oil-modified, urethane polymers in water may appear essentially or nearly transparent and thus may be essentially in solution-like form. The colloidal particle sizes of the urethane polymers of this invention enhance the stability of the polymer dispersions in aqueous compositions that may be infinitely-dilutable in aqueous media, especially in the presence of sufficient coupling solvent. With smaller polymer particles, the tendency to form high gloss films may be increased and the ability of the dispersion to accept pigments is generally enhanced. Colloidal size particles are not readily filtered from the dispersions.

The oil-modified urethane polymers of this invention are advantageously employed as aqueous coating compositions. Frequently, the aqueous compositions have a relatively neutral pH, say, about 6 to 11, preferably about 6.5 to 9.0. The composition can contain other ingredients for coating compositions to modify the properties of the resultant oil-modified urethane, such as driers, plasticizers, pigments, colorants, dyes, surfactants, thickeners, heat stabilizers, levelling agents, anti-cratering agents, fillers, sedimentation inhibitors, ultraviolet-light absorbers, and the like. The additives such as driers, heat stabilizers, ultraviolet-light absorbers, etc., can be intimately dispersed in the reaction mixture and apparently thereby become an integral part of the individual urethane particles when formed. Alternatively, the additive may be introduced after the urethane polymer has been formed, in which case the additive can be incorporated on the surface of the polymer or dispersed in the aqueous medium.

The-oil modified urethane polymers of this invention can comprise a substantial amount of the aqueous compositions of the invention without the compositions having an undesirably high viscosity, and the viscosity of the aqueous dispersion can be lower than that of the oil-modified urethane polymers dissolved in organic solvents. The viscosity of the aqueous dispersions may often be in the range of about 1 to 10 Stokes. The non-volatile content of the aqueous compositions of this invention can often range from about 1 to 45, preferably about 10 to 35, weight percent of the compositions. The non-volatile content of the compositions can vary depending upon the nature of the coating and the manner in which the coating is to be applied, e.g., by spraying, brushing, transfer coating, etc.

The oil-modified urethane polymers of this invention can also be used in applications other than coatings, e.g., in casting to form thin films, as adhesives, and the like. The film-type products generally have a thickness of up to about 30 or more mils or more, and often such products have a thickness of up to about 10 mils. The oil-modified urethanes can be formed into various materials or articles of greater cross-sectional dimensions, and can be employed in the various ways known in the art for utilization of these types of materials. The coatings, due to the use of water in the compositions, can be dried at temperatures of say about 10° C. or more. Advantageously, relatively low temperatures can be employed, however, elevated temperatures can also be used, e.g., temperatures of up to about 150° C. or more to accelerate removal of water and organic solvent.

The invention will be illustrated further by the following examples. All parts and percentages are by weight unless otherwise indicated.

EXAMPLE I

A polyol unsaturated fatty acid ester composition useful in forming "oil-modified" urethane polymers of the present invention is prepared from linseed oil and pentaerythritol. Under inert gas and with agitation, 1864 parts of alkali-refined linseed oil are heated to 540°-550° F. and held for a bleach color of 1-2 Gardner. The linseed oil is cooled to 480°-500° F. and 257 parts of pentaerythritol (Tech.) are added rapidly. 1.5 parts of a calcium naphthenate (4% Ca) transesterification catalyst is added to the mixture which is heated to 480°-490° F. and maintained at that temperature until the cooled polyol ester product is clear, after which the mixture is held at this temperature for two hours and then cooled. The resulting mixture has a hydroxyl value of about 190, a viscosity of about 1.65 to 2.25 Stokes and a color of 2-3 Gardner. Unsaturated fatty acid ester polyol of this type can be used to oil-modify the urethane prepolymers of the present invention.

A carboxylic-group containing, isocyanate-terminated prepolymer useful in preparing the oil-modified, urethane polymers of the present invention, is made by placing tolylene diisocyanate (870 parts), dibutyl tin dilaurate catalyst (0.67 parts) and acetone (838 parts) in a reaction vessel under inert gas. The mixture is agitated and solid 2,2-dimethylolpropionic (DMPA) acid (362 parts) is slowly added to the reaction mixture to form a freely-moving, thin slurry, and then the temperature is raised to 135° F. (57° C.) The reaction mixture is held at this temperature until no DMPA crystals are undissolved and until the isocyanate value of the mixture is 9.3 to 9.5%.

The reaction mixture is cooled and 2121 parts of the linseed oil-pentaerythritol ester polyol prepared as described above is added over an hour period at 110° F. After the polyol ester addition is completed, the temperature of the reaction mixture is raised to 135° F., and the reaction is continued for about five hours until an isocyanate value of about 0.5% is reached.

To provide a polymer solution more suited to water-dispersion, the acetone solvent is replaced with butoxyethanol. The butoxyethanol (1437 parts) is added to the polymer solution and the mixture is heated to 140° F. Acetone is distilled off at 140° F. until a resinous reaction product containing 70% non-volatile is reached. The resulting oil-modified urethane polymer solution has an acid value of 32, a viscosity of 150 Stokes, and a Gardner color of 5.

EXAMPLE II

An aqueous coating composition containing a dispersion of the ammonia-neutrailized polymer of Example I is prepared by mixing the following ingredients in the amounts and in the order indicated.

|  | Parts |
|---|---|
| Final Polymer Solution of Example 1 | 1070 |
| Butoxyethanol (Butyl Cellosolve) | 70 |
| Cobalt Hydrocure drier (Mooney Chemical) | 3 |
| Manganese Hydrocure drier (Mooney Chemical) | 3 |
| *Activ-8 (38% 1,10-phenanthroline) | 3 |
| **L5310 (20% in Butyl Cellosolve) (Union Carbide) | 5 |
| Ammonium Hydroxide (28%) Solution | 35 |
| Water | 1811 |
|  | 3000 |

*drier accelerator
**silicone resin anti-foaming agent

The resulting composition has a pH of about 8.3, a viscosity of about 4 Stokes and a non-volatile content of about 25%. A dispersion of this type is a clear wood varnish which provides a high-gloss, rapid drying film of good abrasion resistance, color and hardness. The varnish composition itself has a high order of storage stability under ambient or 120° F. temperature conditions.

EXAMPLE III

Tolylene diisocyanate (870 parts) DMPA (322 parts), dibutyl tin dilaurate catalyst (1.0 part) and acetone (802 parts) are added to a reaction vessel. The mixture is agitated under inert gas, heated to 140° F. and held at 140° F. for 2 hours to complete the reaction and form a clear, slightly yellow liquid. The reaction mixture is cooled to room temperature. The ester polyol of Example I (2014 parts) is added to the vessel over a 1¼ hour period. The resulting reaction mixture is heated to 130° F. where it is maintained until the isocyanate value is 0.8%.

To provide a polymer solution more suited to water-dispersion, the acetone solvent is replaced with butoxyethanol. The butoxyethanol (1280 parts by weight) is added to the polymer solution and the acetone is distilled off at 150° F. with a strong, inert gas sparge until a resinous reaction product containing 71% non-volatile is reached. The resulting urethane polymer solution has an acid value of 41 (solids basis), a viscosity of 154 Stokes and a Gardner color of 7.

EXAMPLE IV

An aqueous coating composition containing a dispersion of the ammonia-neutralized polymer of Example III is prepared by mixing the following ingredients in the amounts and in the order indicated.

|  | Parts |
| --- | --- |
| Polymer Solution of Example III | 106.0 |
| Butoxyethanol | 8.0 |
| Cobalt Drier (5% Co) | 1.5 |
| L5310 | 0.5 |
| Ammonium Hydroxide (28%) | 3.5 |
| Water | 180.5 |
|  | 300.0 |

The resulting composition is a clear, single phase dispersion having a viscosity of about 7.5 poises and a non-volatile content of about 25%. A 3 mil, wet film of this composition dries to a clear, hard film in 2.5 hours. After 1 week the film has a pencil hardness of HB. The stability of the composition is determined under accelerated ageing conditions at 160° F. After 10 days the dispersion is stable, and 3 mil wet films thereof dry in less than 5 hours. After 20 days at 160° F. there was no separation of polymer and water.

EXAMPLE V

Tolylene diisocyanate (1148 parts) DMPA (503 parts), dibutyl tin dilaurate catalyst (0.65 part) and acetone (927 parts) are added to a reaction vessel. The mixture is agitated under inert gas, heated to 140° F. and held at 140° F. for 3 hours to complete the reaction and form a clear, slightly yellow liquid. The reaction mixture is cooled. The ester polyol of Example I (2058 parts) is added to the vessel over a 1 hour period. The resulting reaction mixture is heated to 150° F. where it is maintained until the isocyanate value is 0.6%. The viscosity increases greatly during the latter stages of reaction. Butoxyethanol (875 parts) is added to the polymer solution. The resulting urethane polymer solution has a non-volatile content of 70.5%, an acid value of 55 (solids basis), a viscosity of 630 Stokes and a Gardner color of 3.

EXAMPLE VI

An aqueous coating composition containing a dispersion of the ammonia-neutralized polymer of Example V is prepared by mixing the following ingredients in the amounts and in the order indicated.

|  | Parts |
| --- | --- |
| Polymer Solution of Example V | 106.0 |
| Butoxyethanol | 8.0 |
| Cobalt Drier (5% Co) | 0.3 |
| Manganese Drier (5% Mn) | 0.3 |
| Activ-8 | 0.3 |
| L5310 | 0.5 |
| Ammonium Hydroxide (28%) | 5.5 |
| Water | 179.1 |
|  | 300.0 |

The resulting composition is a clear, single phase dispersion having a viscosity of about 2.5 poises and a non-volatile content of about 25%. A 3 mil, wet film of this composition dries to a clear, hard film in 1.5 hours. After 1 week the film has a Sward hardness of 52. The films are very hard and brittle, and they failed a cold checking test (alternate heating and cooling of a coated wood panel). Apparently, the acid value of this the oil-modified polymer was insufficient to give the most desirable stability in the presence of the essentially inert, and more hydrophobic solvent. The stability of the aqueous dispersion is determined under accelerated ageing conditions at 160° F., and after 20 days there was no separation of polymer and water.

EXAMPLE VII

A polyol unsaturated fatty acid ester composition useful in forming "oil-modified" urethane polymers of the present invention is prepared from Sylfat V-18 (tall oil fatty acids) and pentaerythritol. Under inert gas and with agitation, 1260 parts of Sylfat V-18 and 284 parts pentaerythritol (tech.) is heated to 440° F. After several hours at this temperature the acid value was found to be about 10. The water of reaction was removed from the reaction flask as it forms. 2.0 parts calcium naphthenate (4%) transesterification catalyst is added and the temperature maintained at 440° F. for an additional 1.5 hours, then cooled. The resulting mixture has a hydroxyl value of about 130, viscosity of about 3 Stokes, acid value of about 4 and a color of 5 Gardner. Unsaturated fatty acid ester polyol of this type can be used to oil-modify the urethane prepolymer of the present invention.

Tolylene diisocyanate (870 parts) DMPA (382 parts), dibutyl tin dilaurate catalyst (0.75 parts) and acetone (967 parts) are added to a reaction vessel. The mixture is agitated under inert gas, heated to 140° F. for 2.5 hours to complete the reaction and form a clear, slightly yellow liquid. The reaction mixture is cooled to 115° F. and 2616 parts of the fatty acid ester described above is added over 0.5 hours. After the polyor ester addition is completed, the temperature is raised to 150° F. and held 4 hours until an isocyanate value of 0.5% is reached. To provide a polymer solution more suited to water dispersion, the acetone solvent is replaced with butoxyethanol. The butoxyethanol (1675 parts) is added to the polymer solution and the mixture heated to 150° F. Acetone is distilled off at 150° F. until a resinous product containing 70.5% non-volatile is reached. The resulting oil-modified urethane polymer has an acid value of 30, a viscosity of 170 Stokes and a Gardner color of 5.

EXAMPLE VIII

An aqueous coating composition containing a dispersion of the ammonia-neutralized polymer of Example VII is prepared by mixing the following ingredients in the order and amounts indicated.

|  | Parts |
| --- | --- |
| Polymer solution of Example VII | 107 |
| Butoxyethanol | 8 |
| Cobalt Hydrocure (5% Co) | 0.3 |
| Manganese Hydrocure (5% Mn) | 0.3 |
| Activ-8 | 0.3 |
| L5310 (20% solution in Butoxyethanol) | 0.5 |
| Ammonium Hydroxide (28%) | 3.6 |
| Water | 180.0 |
|  | 300.0 |

The resulting composition is a clear, single phase dispersion having a viscosity of about 7.0 poises and a non-volatile of about 25%. A 3 mil wet film of this composition dries to a clear hard film in 3.0 hours. After a one week air dry the film has a sward hardness of 30. The stability of the dispersion is determined under accelerated aging conditions at 160° F. After 7 days aging the dispersion is stable and 3 mil wet films dry in less than 5 hours.

EXAMPLE IX

A polyol unsaturated fatty acid ester composition useful in forming "oil-modified" urethane polymers of the present invention is prepared from safflower oil and pentaerythritol. Under inert gas and with agitation, 2070 parts of non-break safflower oil is heated to 540° F. and held for a bleach color of 2 Gardner. The oil is cooled to 480°–490° F. and 286 parts of pentaerythritol (tech) are added rapidly. 2 parts of a calcium naphthenate (4% Ca) transesterification catalyst is added to the mixture which is heated to 480°–490° F. until the polyol ester product is clear, after which the mixture is held at this temperature for 2 hours and then cooled. The resulting mixture has a hydroxyl value of about 186, viscosity of 2.0 Stokes and a color of 2-3 Gardner.

Tolylene diisocyanate (870 parts), DMPA (362 parts), dibutyl tin dilaurate catalyst (1.2 parts) and acetone (835 parts) are added to a reaction vessel. The mixture is agitated under inert gas, heated to 140° F. and held several hours until the reaction liquid is clear. The reaction mixture is cooled to room temperature and 2107 parts of the safflower polyol ester prepared above is added over a 0.5 hour period. After the polyol ester addition is completed, the temperature is raised to 150° F. and held 4 hours, until an isocyanate value of 0.6% is reached. To provide a polymer solution more suited to water dispersion, the acetone solvent is replaced with butoxyethanol. The butoxyethanol (1250 parts) is added to the polymer solution and the mixture heated to 150° F. until a resinous product containing 70% non-volatile is reached. The resulting oil-modified urethane polymer has an acid value of 30, a viscosity of 200 Stokes and a Gardner color of 4.

EXAMPLE X

An aqueous coating composition containing a dispersion of the ammonia-neutralized polymer of Example X is prepared by mixing the following ingredients in the order and amounts indicated.

|  | Parts |
| --- | --- |
| Polymer solution of Example X | 107 |
| Butoxyethanol | 8 |
| Cobalt Hydrocure (5% Co) | 0.3 |
| Manganese Hydrocure (5% Mn) | 0.3 |
| Activ-8 | 0.3 |
| L5310 (20% solution in Butoxyethanol) | 0.5 |
| Ammonium Hydroxide (28%) | 3.8 |
| Water | 179.8 |
|  | 300.0 |

The resulting composition is a clear single phase dispersion having a viscosity of about 4.5 poises and a non-volatile of about 25%. A 3 mil wet film of this composition dries to a clear hard film in 2.0 hours. After a one week air dry the film has a sward hardness of 34. The stability of the dispersion is determined under accelerated aging conditions at 160° F. After 10 days aging the dispersion is stabile and 3 mil wet films dry in less than 5.0 hours.

EXAMPLE XI

Isophorone diisocyanate (1110 parts), DMPA (362 parts) dibutyl tin dilaurate catalyst (1.6 parts) and acetone (1385 parts) are added to a reaction vessel. The mixture is agitated under inert gas, heated to 140° F. and held for several hours to complete the reaction, forming a clear slightly yellow liquid. The reaction mixture is cooled to 100°–110° F. and 1764 parts linseed ester polyol from Example I is added over one hour. After the polyol ester addition is complete, the temperature is raised to 135° F. and held for 6 hours until an isocyanate value of 0.9% is reached. To provide a polymer solution more suited to water dispersion, the acetone solvent is replaced with butoxyethanol.

The butoxyethanol (1317 parts) is added to the polymer solution and the mixture heated to 130° F. Acetone is distilled off until a resinous product containing 72.5% non-volatile is reached. The resulting oil modified urethane polymer has an acid value of 32.5, a viscosity of 160 Stokes and a Gardner color of 4.

EXAMPLE XII

An aqueous coating composition containing a dispersion of the ammonia-neutralized polymer of Example XI is prepared by mixing the following ingredients in the amounts and in the order indicated.

|  | Parts |
| --- | --- |
| Polymer solution of Example XI | 107 |
| Butoxyethanol | 8 |
| Cobalt Hydrocure drier (5% Co) Mooney | 1.2 |
| Ammonium Hydroxide (28% solution) | 3.6 |
| Water | 180.2 |
|  | 300.0 |

The resulting composition is a clear, single phase dispersion having a viscosity of about 3.5 poises and a non-volatile of about 26%. A 3 mil, wet film of this composition dries to a clear hard film in 2 hours. The stability of the composition is determined under accelerated aging conditions at 160° F. After 14 days the dispersion is stable, and 3 mil wet films dry in less than 5 hours.

What is claimed is:

1. A carboxylic group-containing, oil-modified, urethane polymer composition comprising the reaction product of ethylenically-unsaturated fatty acid ester polyol of drying or semi-drying fatty acid having up to about 22 carbon atoms, and isocyanate-terminated, urethane prepolymer of hydrocarbon diisocyanate and dihydroxy alkanoic acid.

2. A urethane polymer composition in accordance with claim 1 wherein said dihydroxy alkanoic acid is comprised of 2,2-dialkylol alkanoic acid in which the alkylol groups have 1 to about 3 carbon atoms.

3. A urethane composition in accordance with claim 2 wherein said 2,2-dialkylol alkanoic acid is comprised of 2,2-dimethylol propionic acid.

4. A urethane polymer composition in accordance with claim 1, 2 or 3 wherein the unsaturated fatty acid ester polyol is comprised of the transesterification product of a drying or semi-drying oil and a polyol.

5. A urethane polymer in accordance with claim 4 wherein the drying oil is comprised of linseed oil, sunflower oil or safflower oil.

6. A urethane polymer composition in accordance with claim 5 wherein the polyol is comprised of pentaerythritol.

7. A urethane polymer composition in accordance with claim 4 wherein the polyol is comprised of pentaerythritol.

8. A urethane polymer composition in accordance with claim 6 or 7 wherein the hydrocarbon diisocyanate is comprised of toluene diisocyanate.

9. A urethane polymer composition in accordance with claim 1, 2, 3, 5, 6, or 7 wherein said polymer is dissolved in a solvent comprised of alkoxyalkanol.

10. A urethane polymer composition in accordance with claim 4 wherein said polymer is dissolved in a solvent comprised of alkoxyalkanol.

11. A urethane polymer composition of claim 10 wherein the alkoxyalkanol solvent is comprised of butoxyethanol.

12. A urethane polymer composition of claim 9 wherein the alkoxyalkanol solvent is comprised of butoxyethanol.

13. A urethane polymer composition in accordance with claim 11 or 12 wherein the hydrocarbon diisocyanate is comprised of tolylene diisocyanate.

14. A stable, aqueous dispersion of an organic solvent solution of an oil-modified urethane polymer, said urethane polymer being an ammonia or amine salt of a carboxylic group-containing, oil-modified urethane polymer composition comprising the reaction product of ethylenically-unsaturated fatty acid ester polyol of drying or semi-drying fatty acid having up to about 22 carbon atoms, and isocyanate-terminated, urethane prepolymer of hydrocarbon diisocyanate and dihydroxy alkanoic acid.

15. An aqueous dispersion in accordance with claim 14 in which the organic solvent is comprised of coupling solvent.

16. An aqueous dispersion in accordance with claim 14 or 15 wherein said dihydroxy alkanoic acid is comprised of 2,2-dialkylol alkanoic acid in which the alkylol groups have 1 to about 3 carbon atoms.

17. An aqueous dispersion in accordance with claim 16 wherein said 2,2-dialkylol alkanoic acid is comprised of 2,2-dimethylol propionic acid.

18. An aqueous dispersion in accordance with claim 14, 15 or 17 wherein the unsaturated fatty acid ester polyol is comprised of the transesterification product of a drying or semi-drying oil and a polyol.

19. An aqueous dispersion in accordance with claim 16 wherein the unsaturated fatty acid ester polyol is comprised of the transesterification product of a drying or semi-drying oil and a polyol.

20. An aqueous dispersion in accordance with claim 19 wherein the drying oil is comprised of linseed oil, sunflower oil or safflower oil.

21. An aqueous dispersion in accordance with claim 20 wherein the polyol is comprised of pentaerythritol.

22. An aqueous dispersion in accordance with claim 21 wherein the hydrocarbon diisocyanate is comprised of tolylene diisocyanate.

23. An aqueous dispersion in accordance with claim 15, 16, 19, 21, or 22 containing alkoxyalkanol as a coupling solvent.

24. An aqueous dispersion in accordance with claim 23 wherein the alkoxyalkanol solvent is comprised of butoxyethanol.

25. An aqueous dispersion in accordance with claim 14, 15, 17, 19, 20, 21, 22 or 24 in which the salt is of ammonia or tertiary amine.

26. An aqueous dispersion of claim 25 in which the salt is of ammonia.

27. A urethane polymer composition in accordance with claim 1, 2, 3, 5, 6, 7, 10, 11 or 12 dissolved in organic solvent comprised of coupling solvent.

* * * * *